US011653665B2

(12) United States Patent
Shin et al.

(10) Patent No.: US 11,653,665 B2
(45) Date of Patent: May 23, 2023

(54) PROCESSED PRODUCTS OF TEA AND METHOD FOR MANUFACTURING THE SAME

(71) Applicant: AMOREPACIFIC CORPORATION, Seoul (KR)

(72) Inventors: Kwanghyun Shin, Yongin-si (KR); Wonkyung Cho, Yongin-si (KR); Jinoh Chung, Yongin-si (KR); Yong Deog Hong, Yongin-si (KR)

(73) Assignee: AMOREPACIFIC CORPORATION, Seoul (KR)

( * ) Notice: Subject to any disclaimer, the term of this patent is extended or adjusted under 35 U.S.C. 154(b) by 297 days.

(21) Appl. No.: 16/997,591

(22) Filed: Aug. 19, 2020

(65) Prior Publication Data
US 2021/0051972 A1 Feb. 25, 2021

(30) Foreign Application Priority Data

Aug. 21, 2019 (KR) .......................... 10-2019-0102336

(51) Int. Cl.
*A23F 3/32* (2006.01)
*A23F 3/10* (2006.01)
*B01J 2/16* (2006.01)
*B01J 2/14* (2006.01)

(52) U.S. Cl.
CPC .................. *A23F 3/32* (2013.01); *A23F 3/10* (2013.01); *B01J 2/14* (2013.01); *B01J 2/16* (2013.01)

(58) Field of Classification Search
CPC ....... A23F 3/32; A23F 3/10; B01J 2/14; B01J 2/16
See application file for complete search history.

(56) References Cited

U.S. PATENT DOCUMENTS

| 4,076,847 A | 2/1978 | Johnson et al. |
| 6,056,949 A | 5/2000 | Menzi et al. |
| 6,287,616 B1 | 9/2001 | Beeson et al. |
| 2006/0062886 A1 | 3/2006 | Takeda |
| 2017/0028032 A1 | 2/2017 | Kitahara et al. |
| 2018/0339006 A1 | 11/2018 | Yoon et al. |

(Continued)

FOREIGN PATENT DOCUMENTS

| CA | 2603002 | * 10/2006 |
| CN | 201064162 | * 5/2008 |
| CN | 104055119 A | 9/2014 |

(Continued)

OTHER PUBLICATIONS

English translation for CN201064162 published May 2008.*

(Continued)

*Primary Examiner* — Anthony J Weier
(74) *Attorney, Agent, or Firm* — Merchant & Gould P.C.

(57) ABSTRACT

Shown are a particulate processed product of tea and a method for preparing the same. The particulate processed product of tea has a sphericity $S_{10}$ value of a particle corresponding to 10% cumulative subdistribution in cumulative distribution measured for the sphericity of tea particles of 0.68 or greater. The processed product of tea is convenient to drink because it is readily wetted and dispersed in water. In addition, it can be easily packaged and used due to a low angle of repose and thus excellent flowability.

20 Claims, 7 Drawing Sheets (56) References Cited

U.S. PATENT DOCUMENTS

2020/0128843 A1    4/2020  Shin et al.

FOREIGN PATENT DOCUMENTS

| | | | |
|---|---|---|---|
| CN | 105767397 | A | 7/2016 |
| CN | 106665944 | A | 5/2017 |
| GB | 1301770 | | 1/1973 |
| JP | 2003-250491 | A | 9/2003 |
| JP | 2006-191845 | A | 7/2006 |
| JP | 2006-288350 | A | 10/2006 |
| JP | 2006-296341 | A | 11/2006 |
| JP | 2008-5703 | A | 1/2008 |
| JP | 2010-068741 | A | 4/2010 |
| JP | 2013-209493 | A | 10/2013 |
| JP | 2016-146780 | A | 8/2016 |
| JP | 6078674 | B2 | 2/2017 |
| JP | 2019-041660 | A | 3/2019 |
| JP | 2019-129717 | A | 8/2019 |
| KR | 0143385 | B1 | 7/1998 |
| KR | 10-0303169 | B1 | 7/2001 |
| KR | 10-0437724 | B1 | 6/2004 |
| KR | 2006061784 | A | 6/2006 |
| KR | 10-2006-0090894 | A | 8/2006 |
| KR | 10-2007-0074702 | A | 7/2007 |
| KR | 10-0776018 | B1 | 11/2007 |
| KR | 10-0797974 | B1 | 1/2008 |
| KR | 20080090808 | A | 10/2008 |
| KR | 10-0899334 | B1 | 5/2009 |
| KR | 10-1311743 | B1 | 9/2013 |
| KR | 10-2013-0142419 | A | 12/2013 |
| KR | 10-2016-0017978 | A | 2/2016 |
| KR | 10-2016-0144418 | A | 12/2016 |
| KR | 10-1689436 | B1 | 12/2016 |
| KR | 10-1691919 | B1 | 12/2016 |
| KR | 10-1691919 | B1 | 1/2017 |
| KR | 10-1694707 | B1 | 1/2017 |
| KR | 10-1758346 | B1 | 7/2017 |
| WO | 2006/085710 | A1 | 8/2006 |
| WO | 2007/081158 | A1 | 7/2007 |

OTHER PUBLICATIONS

Sphericity—Wikipedia. 2022. https://en.wikipedia.org/wiki/Sphericity.*
Arasan et al. "The Relationship between the Angle of Repose and Shape Properties of Granular Materials using Image Analysis" 2011. https://www.researchgate.net/publication/267762994_The_Relationship_between_the_Angle_of_Repose_and_Shape_Properties_of_Granular_Materials_using_Image_Analysis.*
Neuwirth et al. CFD-DEM study and direct measurement of the granular flow in a rotor granulator. Chemical Engineering Science. 2013. vol. 86, pp. 151-163.*
Office Action for Japanese Patent Application No. 2019-193071 (dated Jan. 31, 2023).

* cited by examiner

PROCESSED PRODUCTS OF TEA AND METHOD FOR MANUFACTURING THE SAME

CROSS-REFERENCE TO RELATED APPLICATION

This application claims the priority of Korean Patent Application No. 10-2019-0102336 filed on Aug. 21, 2019, the contents of which in their entirety are herein incorporated by reference.

TECHNICAL FIELD

Disclosed are herein a particulate processed product of tea which is readily wetted and dispersed in water, and a method for preparing the same.

BACKGROUND ART

Green tea powders are inconvenient in that tea utensils, tea pots, etc. are necessary and a long time is required due to decreased dispersibility caused by interparticle aggregation. Recently, many products of green tea powders are commercially available, which are contained in disposable stick packages for drinking after putting in a bottle or a tumbler. However, these products still have the problem that when they are put in water, they are not dispersed easily but agglomerate, so that consumers have to shake for a considerable time before drinking. In addition, for stick products in which a small amount of the green tea powders is packaged (e.g., Rishi Matcha travel packs, Rishi Tea, USA), it is difficult to put the green tea powders of the same quantity due to low fluidity of the powder and there is a high probability of occurrence of defects during sealing due to fine powder.

DISCLOSURE

Technical Problem

In an aspect, the present disclosure is directed to providing a particulate processed product of tea which is readily wetted and dispersed in water.

In another aspect, the present disclosure is directed to providing a method for preparing a particulate processed product of tea which is readily wetted and dispersed in water.

Technical Solution

In an aspect, the present disclosure provides a particulate processed product of tea, comprising tea particles, wherein the tea particles exhibit a sphericity $S_{10}$ value of 0.68 or greater, wherein the sphericity $S_{10}$ value is a sphericity of a particle corresponding to 10% cumulative subdistribution in cumulative distribution measured for the sphericity of tea particles.

In an exemplary embodiment, a sphericity $S_{50}$ value of a particle corresponding to 50% distribution rate in cumulative distribution measured for the sphericity of tea particles may be 0.80 or greater.

In an exemplary embodiment, the sphericity $S_{10}$ value may be 0.70 or greater.

In an exemplary embodiment, the sphericity $S_{10}$ value may be 0.72-0.84.

In an exemplary embodiment, a difference in a sphericity $S_{90}$ value of a particle corresponding to 90% cumulative subdistribution and the sphericity $S_{10}$ value of a particle corresponding to 10% cumulative subdistribution ($S_{90}-S_{10}$) in cumulative distribution measured for the sphericity of tea particles may be less than 0.20. In an exemplary embodiment, the $S_{90}-S_{10}$ may be less than 0.15.

In an exemplary embodiment, the processed product of tea may have an average particle diameter of the total tea particles of 100-300 μm.

In an exemplary embodiment, the processed product of tea may include 20 mass % or less of fine powders based on the total mass of the tea particles and the fine powders may have a particle diameter of 75 μm or smaller.

In an exemplary embodiment, the tea particles may have one or more of following particle size distribution values of i) to iii):

i) a particle size distribution $D_{10}$ value of 50 μm or greater;

ii) a particle size distribution $D_{50}$ value of 100 μm or greater; and iii) a particle size distribution $D_{90}$ value of 200 μm or greater, wherein, in i) to iii), $D_{10}$, $D_{50}$ and $D_{90}$ respectively refer to a particle diameter corresponding to 10% cumulative subdistribution, a median particle diameter and a particle diameter corresponding to 90% cumulative subdistribution in cumulative distribution measured for the particle diameter of tea particles.

In an exemplary embodiment, the particle size distribution $D_{10}$ value may range 50 μm≤$D_{10}$≤200 μm, the particle size distribution $D_{50}$ value may range 100 μm≤$D_{50}$≤250 μm, and the particle size distribution $D_{90}$ value may range 200 μm≤$D_{90}$≤600 μm.

In an exemplary embodiment, the processed product of tea may have an angle of repose of 35° or smaller.

In an exemplary embodiment, the processed product of tea may have a wetting time of 100 seconds or shorter when contacted with water, wherein the wetting time is the time required for the whole processed product of tea to sink below water surface when 1.5 g of the processed product of tea is placed on the water surface.

In an exemplary embodiment, the tea may be tea leaf.

In an exemplary embodiment, the tea may be one or more selected from a group consisting of unfermented tea, semi-fermented tea, fermented tea and post-fermented tea.

In an exemplary embodiment, the tea may be green tea.

In an exemplary embodiment, the processed product of tea may be a fine granule or a powder.

In another aspect, the present disclosure provides method for preparing a particulate processed product of tea, which includes preparing tea particles from tea powder.

In an exemplary embodiment, the preparing tea particles comprises using a rotor-type fluidized-bed granulator comprising a rotor disc to prepare the tea particles.

In an exemplary embodiment, the rotor-type fluidized-bed granulator may include: a container; a rotor disc formed inside the container; a gap-forming part provided between the rotor disc and a wall of the container and supplying air; and a nozzle-forming part formed adjacent to the gap-forming part and spraying water into the container.

In an exemplary embodiment, the preparing tea particles comprises: placing tea powder on a rotor disc and rotating the rotor disc; levitating the tea powder by supplying air; and spraying water to the levitated tea powder.

In an exemplary embodiment, the tea powder constituting 99 mass % or more of the total mass of the tea powder may have a particle diameter of 75 μm or smaller.

Advantageous Effects

In an aspect, the present disclosure provides a particulate processed product of tea which is readily wetted and dispersed in water.

In another aspect, the present disclosure provides a method for preparing a particulate processed product of tea which is readily wetted and dispersed in water.

The processed product of tea of one aspect of the present disclosure is convenient to drink because it is readily wetted and dispersed in water. In addition, it can be easily packaged and used due to a low angle of repose and thus excellent flowability.

BRIEF DESCRIPTION OF DRAWINGS

FIG. 4 shows a result of Comparative Example 1, FIG. 5 shows a result of Comparative Example 4, FIG. 6 shows a result of Comparative Example 5, FIG. 7 shows a result of Comparative Example 6, and FIG. 8 shows a result of Comparative Example 7.

BEST MODE

Hereinafter, the present disclosure is described in detail.

In an aspect, the present disclosure provides a particulate processed product of tea, comprising tea particles, wherein the tea particles exhibit a sphericity $S_{10}$ value of 0.68 or greater, wherein the sphericity $S_{10}$ value is a sphericity of a particle corresponding to 10% cumulative subdistribution in cumulative distribution measured for the sphericity of tea particles.

In an exemplary embodiment, the processed product of tea may consist of the tea particles.

In an exemplary embodiment, the tea particles may be formed from tea powders.

As used herein, the 'particulate processed product of tea' refers to a processed product of tea in the form of particles. The processed product of tea may be in the form of particles formed by agglomeration of a plurality of tea powders. For example, the processed product of tea may include tea particles formed by agglomeration of a plurality of tea powders caused by addition of water to the tea powders. When moisture is added to the dry fine powders, the powder ingredients are made to have adhesiveness, which causes them to agglomerate with each other, thereby forming particles about 30-150 times larger than the powders. Those obtained by drying these particles may be referred to as fine granules or granules. Generally, the powders are finely granulated or granulated to improve flowability, preservability, etc.

In an exemplary embodiment, the 'particulate' processed product may have a spherical or elliptical shape.

As used herein, the 'tea powder' refers to powder obtained from tea tree (*Camellia sinensis*) as a raw material. For example, it may refer to powder obtained by pulverizing, crushing or milling tea leaves, or powder obtained from an extract of tea leaves through a process such as spray drying, etc. The tea leaves can be used without being limited by harvest time, the presence or absence of processing, processing method, etc.

In an exemplary embodiment, the tea powder may be obtained using a pulverization device. Pulverization devices can be broadly classified into crushers, grinders, etc. A crusher is a device for pulverizing large chunks of solid, and examples thereof include a jaw crusher, a gyratory crusher, etc. A grinder is a device for making powder primarily pulverized in a crusher into smaller pulverized products, or for manufacturing fine powder without primary pulverization. Examples of the grinder include a hammer mill, a roller mill, a ball mill, an attrition mill, an air-flow type mill, etc. When preparing green tea powders by pulverizing the leaves of tea tree, the aforementioned pulverization devices, in particular, an electric millstone, a ball mill, a hammer mill, etc. are used.

In an exemplary embodiment, the tea powder may have a particle diameter of 50 μm or smaller, 1-50 μm, or 10-50 μm.

In an exemplary embodiment, the tea powder constituting 99 mass % or more of the total mass of the tea powder may have a particle diameter of 75 μm or smaller.

In an exemplary embodiment, the tea may be tea leaf.

In an exemplary embodiment, the tea may be one or more selected from a group including unfermented tea such as green tea, etc., fermented tea such as black tea, etc., semi-fermented tea such as oolong tea, white tea, flower tea, etc., and post-fermented tea such as puer tea, yellow tea, etc.

In an exemplary embodiment, the tea may be green tea.

In an exemplary embodiment, the tea may be green tea leaf.

In an exemplary embodiment, the processed product of tea may be formed from tea powder. It may consist of 100% tea powder without the use of other additives. In another exemplary embodiment, the processed product of tea may consist of 90 mass % or more or 95 mass % or more of tea powder based on the total mass of the processed product.

In the present disclosure, the sphericity of tea particle may refer to the sphericity of the particulate processed product of tea.

The processed product of tea according to one aspect of the present disclosure has excellent wettability and dispersibility (spreadability of particles). One aspect of the present disclosure provides a processed product of tea having so rapid a dispersion rate that the conventional process of stirring or shaking to disperse powdered green tea or granules of powdered green tea in water is not necessary. In addition, since the processed product of tea has excellent redispersibility, it does not stick to or agglomerate with each other after being dispersed in water, and maintains a dispersed state over time. The processed product of tea exhibits excellent dispersibility and redispersibility in both cold and hot water regardless of the temperature of the water.

Also, the processed product of tea according to one aspect of the present disclosure has the advantage of excellent flowability or fluidity. Thus, the processed product of tea is easy to package and offers advantages in manufacturing processes such as filling, sealing, etc. when packaged as a stick (for example, it is easy to package with a fixed quantity and prevents defects that may occur during sealing). Further, it provides convenience for consumers because it allows easy discharge of particles.

In an exemplary embodiment, the sphericity $S_{10}$ value may be 0.68 or greater, 0.69 or greater, 0.70 or greater, 0.71 or greater, 0.72 or greater, or 0.73 or greater.

In an exemplary embodiment, the sphericity $S_{10}$ value may be 0.68-0.88.

In another exemplary embodiment, the sphericity $S_{10}$ value may be 0.68 or greater, 0.69 or greater, 0.70 or greater, 0.71 or greater, 0.72 or greater, or 0.73 or greater, and may be 0.88 or smaller, 0.87 or smaller, 0.86 or smaller, 0.85 or smaller, 0.84 or smaller, 0.83 or smaller, or 0.82 or smaller.

In an exemplary embodiment, the sphericity $S_{10}$ value may be 0.72-0.84.

In an exemplary embodiment, a difference in a sphericity $S_{90}$ value of a particle corresponding to 90% cumulative subdistribution and the sphericity $S_{10}$ value of a particle corresponding to 10% cumulative subdistribution ($S_{90}-S_{10}$) in cumulative distribution measured for the sphericity of tea particles may be less than 0.20.

In an exemplary embodiment, the $S_{90}-S_{10}$ may be less than 0.15.

In an exemplary embodiment, the processed product of tea may have an average particle diameter of the total tea particles of 100-300 μm.

In another exemplary embodiment, the processed product of tea may have an average particle diameter of the total tea particles of 100 μm or larger, 110 μm or larger, 120 μm or larger, 130 μm or larger, 140 μm or larger, 150 μm or larger, 160 μm or larger, 170 μm or larger, 180 μm or larger, 190 μm or larger, or 200 μm or larger, and 300 μm or smaller, 290 μm or smaller, 280 μm or smaller, 270 μm or smaller, 260 μm or smaller, 250 μm or smaller, 240 μm or smaller, 230 μm or smaller, 220 μm or smaller, 210 μm or smaller, or 200 μm or smaller.

In an exemplary embodiment, the processed product of tea may include 20 mass % or less of fine powders based on the total mass of the tea particles.

As used herein, the 'fine powders' refer to particles having a tea particle size, i.e., a particle diameter (also referred to as a grain diameter), of 75 μm (200 mesh) or smaller. In the present disclosure, the particle diameter may mean the longest diameter of the particle.

In an exemplary embodiment, the processed product of tea may include 20 mass % or less, 19 mass % or less, 18 mass % or less, 17 mass % or less, 16 mass % or less, 15 mass % or less, 14 mass % or less, 13 mass % or less, 12 mass % or less, 11 mass % or less, 10 mass % or less, 9 mass % or less, 8 mass % or less, 7 mass % or less, 6 mass % or less, 5 mass % or less, 4 mass % or less, 3 mass % or less, 2 mass % or less or 1 mass % or less of fine powders based on the total mass of the tea particles. In another exemplary embodiment, the processed product of tea may not include fine powders or may include 0.0001-20 mass %, 0.001-20 mass %, 0.01-20 mass %, 0.05-20 mass % or 0.1-20 mass % of fine powders based on the total mass of the tea particles. Here, the total mass of the tea particles may refer to the total mass of the processed product of tea.

In an exemplary embodiment, the tea particles may have one or more of following particle size distribution values of i) to iii), wherein the tea particles may refer to a processed product of tea:

i) a particle size distribution $D_{10}$ value of 50 μm or greater;

ii) a particle size distribution $D_{50}$ value of 100 μm or greater; and iii) a particle size distribution $D_{90}$ value of 200 μm or greater.

In i) to iii), $D_{10}$, $D_{50}$ and $D_{90}$ respectively refer to a particle diameter corresponding to 10% cumulative subdistribution, a median particle diameter and a particle diameter corresponding to 90% cumulative subdistribution in cumulative distribution measured for the particle diameter of tea particles.

In an exemplary embodiment, the particle size distribution $D_{10}$ value may be 50 μm or greater, 60 μm or greater, 70 μm or greater, 80 μm or greater, 90 μm or greater, or 100 μm or greater, and may be 200 μm or smaller, 190 μm or smaller, 180 μm or smaller, 170 μm or smaller, 160 μm or smaller, 150 μm or smaller, 140 μm or smaller, 130 μm or smaller, 120 μm or smaller, 110 μm or smaller, or 100 μm or smaller.

In an exemplary embodiment, the particle size distribution $D_{50}$ value may be 100 μm or greater, 110 μm or greater, 120 μm or greater, 130 μm or greater, 140 μm or greater, or 150 μm or greater, and may be 250 μm or smaller, 240 μm or smaller, 230 μm or smaller, 220 μm or smaller, 210 μm or smaller, or 200 μm or smaller.

In an exemplary embodiment, the particle size distribution $D_{90}$ value may be 200 μm or greater, 220 μm or greater, 240 μm or greater, 260 μm or greater, 280 μm or greater, or 300 μm or greater, and may be 600 μm or smaller, 550 μm or smaller, 500 μm or smaller, 450 μm or smaller, 400 μm or smaller, 350 μm or smaller, 340 μm or smaller, 330 μm or smaller, 320 μm or smaller, 310 μm or smaller, or 300 μm or smaller.

In an exemplary embodiment, the particle size distribution $D_{10}$ value may range 50 μm≤$D_{10}$≤200 μm, the particle size distribution $D_{50}$ value may range 100 μm≤$D_{50}$≤250 μm, and the particle size distribution $D_{90}$ value may range 200 μm≤$D_{90}$≤600 μm.

In an exemplary embodiment, the processed product of tea may have an angle of repose of 35° or smaller, specifically 30° or smaller, and thus has excellent flowability and fluidity, so that it is easy to package and use. The angle of repose refers to the angle at which piled tea particles can be maintained stably. The larger the angle of repose is, the lower the flowability is.

In an exemplary embodiment, the processed product of tea may have a wetting time of 100 seconds or shorter, 90 seconds or shorter, 80 seconds or shorter, 70 seconds or shorter, 60 seconds or shorter, 50 seconds or shorter, 40 seconds or shorter, 30 seconds or shorter, 20 seconds or shorter or 10 seconds or shorter when contacted with water.

In an exemplary embodiment, the wetting time may refer to the time required for the whole processed product of tea to sink below water surface when 1.5 g of the processed product of tea is placed on the water surface. That is to say, the wetting time may refer to the time required for the whole processed product of tea to be immersed in water when 1.5 g of the processed product of tea is placed on the water surface without any physical or chemical treatment.

In an exemplary embodiment, the amount of the water may be 500 mL.

In an exemplary embodiment, the wetting time may refer to the time required for the whole processed product of tea to sink below water surface when 1.5 g of the processed product of tea is placed on the surface of water at 15-25° C., under room temperature.

In an exemplary embodiment, the processed product of tea may be fine granule or powder.

In an exemplary embodiment, the processed product of tea may be one obtained by filling processed tea particles into a capsule or a packet in the form of a stick or one processed into the form of a foaming tablet, a dispersible tablet, etc.

The processed product of tea according to one aspect of the present disclosure may be composed of 100% of tea powder without any binder, etc. Since the existing fine granules or granules are prepared by spraying a solution in which a binder is dissolved in water onto tea powder, they have a thick color or give an unpleasant aftertaste when dispersed or dissolved in water. In contrast, the processed product of tea according to one aspect of the present disclosure not only excludes the elements that negatively affect palatability, but also has remarkably enhanced dispersibility in a solvent, e.g., water. Further, since it does not contain a binder, etc. it can provide the effect of simplifying the process and improving palatability.

In another aspect, the present disclosure provides a method for preparing a particulate processed product of tea, which includes preparing tea particles from tea powder.

In an exemplary embodiment, the processed product of tea may be prepared only with tea powder and water.

In an exemplary embodiment, the particulate processed product of tea may be prepared using a rotor-type fluidized-bed granulator including a rotor disc. By using the rotor-type fluidized-bed granulator including a rotor disc, a particulate processed product of tea with superior dispersibility and flowability can be prepared only with tea powder and water without use of other additives.

A fluidized-bed granulator is a device generally used for making powders or granules from liquids, granulating powders, coating drug ingredients, etc., and is mainly used for manufacturing food or pharmaceuticals. The general operation mechanism of the fluidized-bed granulator is as follows. Granules of a designed compositional ratio are prepared in a fluidized bed in which liquids, powders, and granules are fluidized by air pressure. The fluidized-bed rotor granulator used in the present disclosure is a fluidized-bed granulator including a rotor disc, and centrifugal force may be applied to the tea powder by the rotation of the rotor disc.

In an exemplary embodiment, the speed of the rotor disc may be adjustable.

In an exemplary embodiment, the rotor-type fluidized-bed granulator may include: a container; and a rotor disc formed inside the container.

In an exemplary embodiment, the rotor-type fluidized-bed granulator may include: a container; and a horizontal rotor disc formed inside the container, and air may be supplied to a gap between the rotor disc and a wall of the container.

In an exemplary embodiment, the rotor-type fluidized-bed granulator may spray water into the container through a spray nozzle formed adjacent to the gap supplying air.

In an exemplary embodiment, the rotor-type fluidized-bed granulator may include a gap-forming part formed between the rotor disc and the wall of the container and supplying air.

In an exemplary embodiment, the rotor-type fluidized-bed granulator may include a nozzle-forming part formed adjacent to the gap-forming part and spraying water into the container and above the rotor disc.

In an exemplary embodiment, the nozzle-forming part may be formed such that water is sprayed in an upward direction.

In an exemplary embodiment, the rotor-type fluidized-bed granulator may prepare the particulate processed product of tea at a speed of 90-1,200 rpm. The rotation speed of the rotor disc may vary widely depending on the size of the device. For example, a rotor disc for laboratory use, which has a small size (for example, the rotor disc of Glatt's GPCG-1 has a diameter of 30 cm), may be operated at a speed in the range of about 360-1,200 rpm when preparing tea particles, and a rotor disc for large-scale production having a size of 1,200 cm may be operated at a speed in the range of about 90-300 rpm.

In an exemplary embodiment, the rotor disc prepares tea particles at a tip speed of 2-20 m/sec, 3-20 m/sec, 4-20 m/sec or 5-20 m/sec and thus has the effect of providing a processed product of tea with improved dispersibility and flowability.

In an exemplary embodiment, the rotor-type fluidized-bed granulator may prepare the particulate processed product of tea under the condition of an inlet temperature of 15-40° C., an exhaust temperature of 10-35° C., a spray nozzle diameter of 1.0-2.0 mm, a spray pressure of 1.0-5.0 bar and/or a drying temperature of 40-80° C.

In an exemplary embodiment, the rotor-type fluidized-bed granulator may prepare the particulate processed product of tea under the condition of an inlet temperature of 25-35° C., an exhaust temperature 15-30° C., a spray nozzle diameter of 1.0-2.0 mm, a spray pressure of 1.0-3.0 bar and/or a drying temperature of 60-80° C.

In an exemplary embodiment, the rotor-type fluidized-bed granulator may prepare the particulate processed product of tea with an air supply volume of 150-2,000 m$^3$/hr or 600-1,000 m$^3$/hr, which can be adjusted appropriately depending on the size of the rotor-type fluidized-bed granulator.

In an exemplary embodiment, the particulate processed product of tea may be prepared by spraying water to tea powder.

In an exemplary embodiment, the preparing tea particles may include: placing tea powder on a rotor disc and applying centrifugal force to the tea powder by rotating the rotor disc; levitating the tea powder by supplying air; spraying water to the levitated tea powder; and dropping the tea powder contacted with water by gravity.

As described above, the method for preparing a processed product of tea according to one aspect of the present disclosure can prepare tea particles using three types of forces: centrifugal force caused by the rotation of the rotor disc; levitating force caused by the inlet air passing through the gap between the rotor disc and the container wall; and gravitational force which makes materials drop onto the rotor disc.

Conventionally, powders having a particle diameter of 50 μm or smaller, which are too fine, have a limitation in that the size of the prepared particles are not as large as desired even after being processed with a fluidized-bed granulator. The method for preparing a processed product of tea according to one aspect of the present disclosure allows preparation of tea particles having a desired size for a short time of about 2 hours or shorter, even if the tea powders constituting 99% by weight or more have a particle diameter of 75 μm or smaller. The processed product of tea prepared by the preparation method has excellent dispersibility in water and provides improved flowability of tea particles, so that it is easier to package and use.

In an exemplary embodiment, in the preparation method, an amount of water corresponding to 0.3-1.5 times of the mass of tea powder may be sprayed to the tea powder.

In an exemplary embodiment, the preparation method may further include removing fine powders with a particle diameter of 75 μm or smaller.

Hereinafter, the present disclosure will be described in detail through examples. However, it will be apparent to those of ordinary skill in the art that these examples are for illustrative purposes only and the scope of the present disclosure is not limited by the examples.

Example 1

600 g of powdered green tea (O'sulloc Farm, Korea) was put in a rotor-type fluidized-bed granulator (GPCG-1, rotor type, Glatt, Germany) and a particulate processed product of tea having a sphericity $S_{10}$ value of 0.68 or greater was prepared by spraying 750 g of water under the condition described below. The processed product passed through a sieve of 30 mesh (600 μm) was used.

Inlet air temperature: 30° C., exhaust temperature: 23±5° C., nozzle inner diameter: 1.0 mm, spray pressure: 1.0 bar, air flap: 25-30%, rotor rpm: 540 rpm, drying temperature: 70° C.

Example 2

600 g of powdered green tea (O'sulloc Farm, Korea) was put in a rotor-type fluidized-bed granulator (GPCG-1, rotor type, Glatt, Germany) and a particulate processed product of tea having a sphericity $S_{10}$ value of 0.68 or greater was prepared by spraying 660 g of water under the condition described below. The processed product passed through a sieve of 30 mesh (600 μm) was used.

Inlet air temperature: 30° C., exhaust temperature: 23±5° C., nozzle inner diameter: 1.0 mm, spray pressure: 1.0 bar, air flap: 25-30%, rotor rpm: 540 rpm, drying temperature: 70° C.

Example 3

600 g of powdered green tea (O'sulloc Farm, Korea) was put in a rotor-type fluidized-bed granulator (GPCG-1, rotor type, Glatt, Germany) and a particulate processed product of tea having a sphericity $S_{10}$ value of 0.68 or greater was prepared by spraying 600 g of water under the condition described below. The processed product passed through a sieve of 30 mesh (600 μm) was used.

Inlet air temperature: 30° C., exhaust temperature: 23±5° C., nozzle inner diameter: 1.0 mm, spray pressure: 1.0 bar, air flap: 25-30%, rotor rpm: 720 rpm, drying temperature: 70° C.

Example 4

600 g of powdered green tea (O'sulloc Farm, Korea) was put in a rotor-type fluidized-bed granulator (GPCG-1, rotor type, Glatt, Germany) and a particulate processed product of tea having a sphericity $S_{10}$ value of 0.68 or greater was prepared by spraying 500 g of water under the condition described below. The processed product passed through a sieve of 30 mesh (600 μm) was used.

Inlet air temperature: 30° C., exhaust temperature: 23±5° C., nozzle inner diameter: 1.0 mm, spray pressure: 1.0 bar, air flap: 25-30%, rotor rpm: 360 rpm, drying temperature: 50° C.

Example 5

600 g of powdered green tea (O'sulloc Farm, Korea) was put in a rotor-type fluidized-bed granulator (GPCG-1, rotor type, Glatt, Germany) and a particulate processed product of tea having a sphericity $S_{10}$ value of 0.68 or greater was prepared by spraying 600 g of water under the condition described below. The processed product passed through a sieve of 30 mesh (600 μm) was used.

Inlet air temperature: 30° C., exhaust temperature: 23±5° C., nozzle inner diameter: 1.0 mm, spray pressure: 1.0 bar, air flap: 25-30%, rotor rpm: 720 rpm, drying temperature: 65° C.

Example 6

600 g of powdered green tea (O'sulloc Farm, Korea) was put in a rotor-type fluidized-bed granulator (GPCG-1, rotor type, Glatt, Germany) and a particulate processed product of tea having a sphericity $S_{10}$ value of 0.68 or greater was prepared by spraying 700 g of water under the condition described below. The processed product passed through a sieve of 30 mesh (600 μm) was used.

Inlet air temperature: 30° C., exhaust temperature: 23±5° C., nozzle inner diameter: 1.0 mm, spray pressure: 1.0 bar, air flap: 23-28%, rotor rpm: 360 rpm, drying temperature: 80° C.

Example 7

40 kg of powdered green tea (O'sulloc Farm, Korea) was put in a rotor-type fluidized-bed granulator (WBF200/120/100, rotor type, Enger, China) and a particulate processed product of tea having a sphericity $S_{10}$ value of 0.68 or greater was prepared by spraying 34 kg of water under the condition described below. The processed product passed through a sieve of 30 mesh (600 μm) was used.

Inlet air temperature: 23° C., exhaust temperature: 23±5° C., nozzle inner diameter: 1.5 mm, spray pressure: 3.0 bar, air supply: 800 m³/hr, rotor rpm: 240 rpm, drying temperature: 70° C.

Comparative Example 1

500 g of powdered green tea (O'sulloc Farm, Korea) was put in a top-spray fluidized-bed granulator (GPCG-1, top spray type, Glatt, Germany) and a particulate processed product of tea was prepared by spraying 300 g of water under the condition described below. The processed product passed through a sieve of 30 mesh (600 μm) was used.

Inlet air temperature: 30° C., exhaust temperature: 23±5° C., nozzle inner diameter: 1.0 mm, spray pressure: 1.0 bar, air flap: 25-30%, drying temperature: 70° C.

Comparative Example 2

475 g of powdered green tea (O'sulloc Farm, Korea) was put in a top-spray fluidized-bed granulator (GPCG-1, top spray type, Glatt, Germany) and a particulate processed product of tea was prepared by spraying a solution of 25 g of maltitol dissolved in 485 g of water under the condition described below. The processed product passed through a sieve of 30 mesh (600 μm) was used.

Inlet air temperature: 50° C., exhaust temperature: 27±5° C., nozzle inner diameter: 1.0 mm, spray pressure: 1.0 bar, air flap: 25-30%, drying temperature: 70° C.

Comparative Example 3

350 g of powdered green tea (O'sulloc Farm, Korea) and 125 g of mannitol were mixed and put in a top-spray fluidized-bed granulator (GPCG-1, top spray type, Glatt, Germany) and a particulate processed product of tea was prepared by spraying a solution of 25 g of maltitol dissolved in 525 g of water under the condition described below. The processed product passed through a sieve of 30 mesh (600 μm) was used.

Inlet air temperature: 50° C., exhaust temperature: 25±5° C., nozzle inner diameter: 1.0 mm, spray pressure: 1.0 bar, air flap: 25-30%, drying temperature: 70° C.

Comparative Example 4

495 g of powdered green tea (O'sulloc Farm, Korea) was put in a top-spray fluidized-bed granulator (GPCG-1, top spray type, Glatt, Germany) and a particulate processed product of tea was prepared by spraying a solution of 5 g of maltodextrin dissolved in 295 g of water under the condition described below. The processed product passed through a sieve of 30 mesh (600 μm) was used.

Inlet air temperature: 60° C., exhaust temperature: 30±5° C., nozzle inner diameter: 1.0 mm, spray pressure: 1.0 bar, air flap: 25-30%, drying temperature: 70° C.

Comparative Example 5

Powdered green tea (O'sulloc Farm, Korea) was selected for Comparative Example 5 and was used in the test examples described below.

Comparative Example 6

Commercially available Rishi matcha (Rishi Matcha travel packs, Rishi-Tea) was selected for Comparative Example 6 and was used in the test examples described below.

Comparative Example 7

Commercially available Encha organic matcha (Encha organic matcha green tea powder packets, Encha) was selected for Comparative Example 7 and was used in the test examples described below.

Comparative Example 8

Crystalline cellulose (CELLETS® 100, IPC (International Process Center), Germany), which is a commercially available crystalline powder, was selected for Comparative Example 8 and used in the test examples described below. The sphericity of the crystalline cellulose used in Comparative Example 8 was measured with a particle shape analyzer (The result is shown in Table 1). When the crystalline cellulose was measured with a particle size analyzer, the proportion of fine powders having a particle diameter of 75 μm or smaller was 0.1%.

Test Example 1. Measurement of Sphericity

The sphericity of Examples 1-7 and Comparative Examples 1-8 was measured using a particle shape analyzer (QICPIC450, Sympatec, Germany). The result is shown in Table 1. After dispersing the particles with a pressure of 2 bar in airflow and imaging the projection of the particles using an imaging device, the shape of the particles was measured and calculated. The sphericity was calculated by dividing the circumference of a circle having the same area as each particle measured from the projection by the actual circumference of the particle (see the equation given below). The sphericity has a value between 0 and 1. The closer the value to 1, the closer is the particle to a spherical shape.

(Circumference of circle having the same area as particle projection circumference)/(Particle projection circumference)=2×SQRT(π–Particle projection circumference)/(Particle projection circumference)

Test Example 2. Analysis of Particle Size

The particle size distribution, average particle size, proportion of particles having a specific range of particle size (75 μm or smaller), etc. were measured for Examples 1-7 and Comparative Examples 1-8 using a particle size analyzer (Mastersizer, Malvern, UK). The result is shown in Table 2.

Test Example 3. Measurement of Wetting Time 1.5 g of each of the samples of Examples 1-7 and Comparative Examples 1-8 was carefully placed in a beaker containing 500 mL of water at the same temperature as room temperature. Then, wetting time, which is the time required to sink below water surface without agglomeration on the surface, was measured. The result is shown in Table 2, FIGS. 1-8, 11 and 12. The wetting time was the time measured until all of the sample sank below the water surface after it was left alone without application of physical force such as stirring or shaking.

Test Example 4. Measurement of Angle of Repose

Each samples of Examples 1-7 and Comparative Examples 1-7 was placed in a funnel through which powders were to be passed, with the funnel fixed to the bottom surface. Then, the funnel was lifted gradually to form a pile in the form of a cone. The average of the diameters at four points of the piled up cone and the height of the cone were measured, and then the angle of repose was determined using the equation given below. The result is shown in Table 2.

tan α=height/(0.5×base diameter)

The angle of repose is an index indicative of the fluidity (flowability) of particles. Generally, an angle of 25-30° indicates very good fluidity, an angle of 31-35° indicates good fluidity, and an angle of 36-40° indicates slightly good fluidity. When the fluidity is excellent, a desired amount of particles can be filled in a capsule or a stick package or can be tableted into a tablet, thus facilitating the process.

Test Results

TABLE 1

| Test sample | Sphericity distribution | | |
|---|---|---|---|
| | $S_{10}$ | $S_{50}$ | $S_{90}$ |
| Example 1 | 0.7780 | 0.8351 | 0.8741 |
| Example 2 | 0.7581 | 0.8205 | 0.8607 |
| Example 3 | 0.7437 | 0.8125 | 0.8597 |
| Example 4 | 0.7316 | 0.8043 | 0.8560 |
| Example 5 | 0.7502 | 0.8201 | 0.8694 |
| Example 6 | 0.7578 | 0.8165 | 0.8627 |
| Example 7 | 0.8117 | 0.8749 | 0.9087 |
| Comparative Example 1 | 0.6257 | 0.7773 | 0.8807 |
| Comparative Example 2 | 0.6676 | 0.8145 | 0.8961 |
| Comparative Example 3 | 0.6768 | 0.8162 | 0.8928 |
| Comparative Example 4 | 0.6753 | 0.8186 | 0.8977 |
| Comparative Example 5 | 0.5955 | 0.8052 | 0.9057 |
| Comparative Example 6 | 0.6258 | 0.8280 | 0.9169 |
| Comparative Example 7 | 0.6514 | 0.8452 | 0.9201 |
| Comparative Example 8 | 0.8584 | 0.9123 | 0.9352 |

$S_{10}$: sphericity of a particle corresponding to 10% cumulative subdistribution
$S_{50}$: sphericity at the point where the distribution ratio of a particle corresponds to 50%
$S_{90}$: sphericity of a particle corresponding to 90% cumulative subdistribution

TABLE 2

| Test sample | Particle size distribution (μm) | | | Average diameter ($D_{4.3}$, μm) | Proportion of fine powders (≤75 μm) (%) | Angle of repose (°) | Wetting time (sec) |
|---|---|---|---|---|---|---|---|
| | $D_{10}$ | $D_{50}$ | $D_{90}$ | | | | |
| Ex. 1 | 153 | 231 | 294 | 226 | 1.0 | 27.8 | 9 |
| Ex. 2 | 136 | 219 | 287 | 213 | 1.8 | 28.4 | 13 |
| Ex. 3 | 130 | 201 | 310 | 230 | 0.0 | 26.7 | 11 |
| Ex. 4 | 60 | 148 | 264 | 157 | 14.5 | 26.0 | 23 |
| Ex. 5 | 76 | 128 | 204 | 134 | 9.6 | 27.8 | 44 |
| Ex. 6 | 120 | 185 | 282 | 194 | 0.1 | 24.9 | 8 |
| Ex. 7 | 92 | 216 | 603 | 294 | 4.0 | 25.6 | 16 |
| Comp. Ex. 1 | 22 | 83 | 173 | 92 | 44.6 | 35.3 | 180< |
| Comp. Ex. 2 | 18 | 42 | 84 | 49 | 85.6 | 35.4 | 180< |
| Comp. Ex. 3 | 23 | 52 | 102 | 58 | 74.7 | 33.6 | 180< |
| Comp. Ex. 4 | 17 | 42 | 84 | 48 | 85.5 | 34.9 | 180< |
| Comp. Ex. 5 | 4 | 16 | 43 | 20 | 94.7 | 55.5 | 180< |
| Comp. Ex. 6 | 2 | 8 | 27 | 12 | 99.8 | 54.1 | 180< |
| Comp. Ex. 7 | 2 | 7 | 20 | 9 | 100.0 | 52.7 | 180< |

Figure 1:
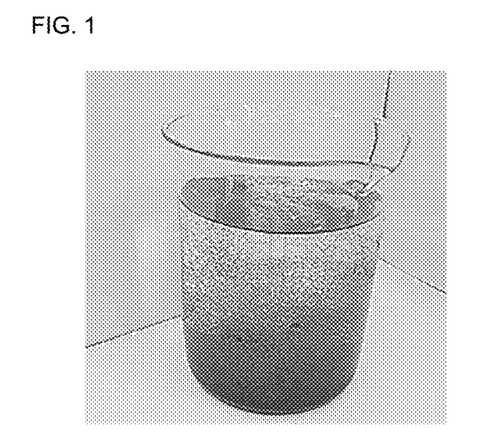
FIG. 1 is a photograph showing a processed product of tea dispersed in water, immediately after measuring wetting time (13 seconds) after putting a sample of Example 2 in water, according to a Test Example of the present disclosure.
Figure 2:
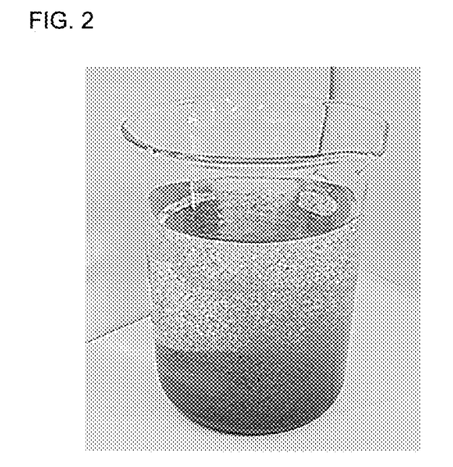
FIG. 2 is a photograph showing a processed product of tea dispersed in water, immediately after measuring wetting time (11 seconds) after putting a sample of Example 3 in water, according to a Test Example of the present disclosure.
Figure 3:
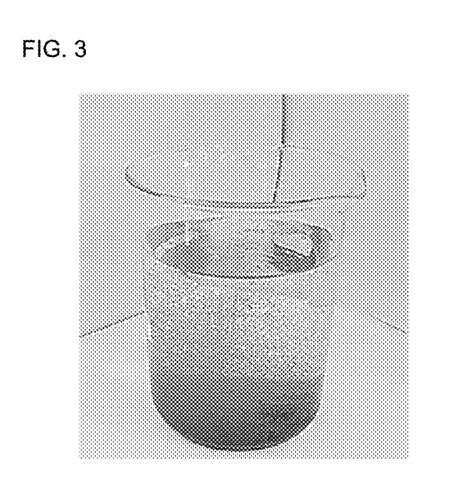
FIG. 3 is a photograph showing a processed product of tea dispersed in water, immediately after measuring wetting time (23 seconds) after putting a sample of Example 4 in water, according to a Test Example of the present disclosure.
Figure 4:
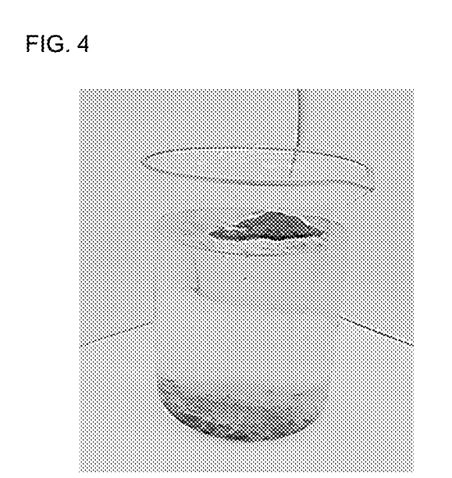
FIGS. 4, 5, 6, 7, and 8 are photographs showing samples of Comparative Examples 1 and 4-7 dispersed in water when 3 minutes have elapsed after putting the samples in water, according to a Test Example of the present disclosure. The samples of Comparative Examples 1 and 4-7 were not wetted and a significant amount remained on the water surface even after 3 minutes.
Figure 5:
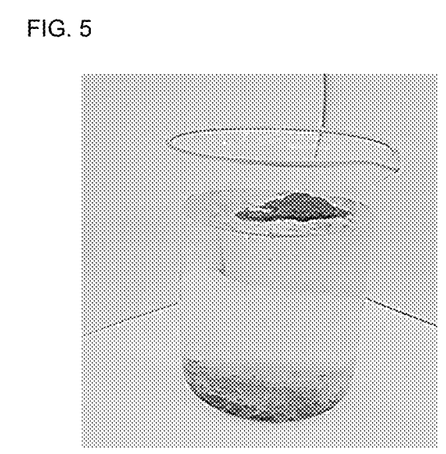
Figure 6:
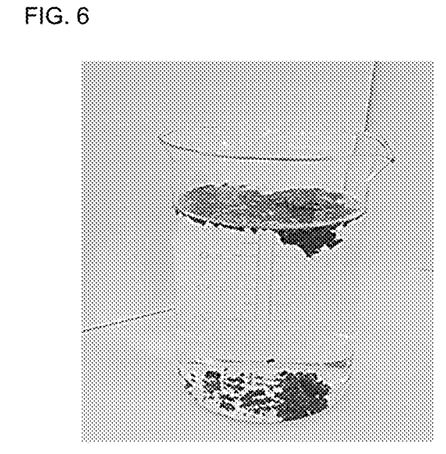
Figure 7:
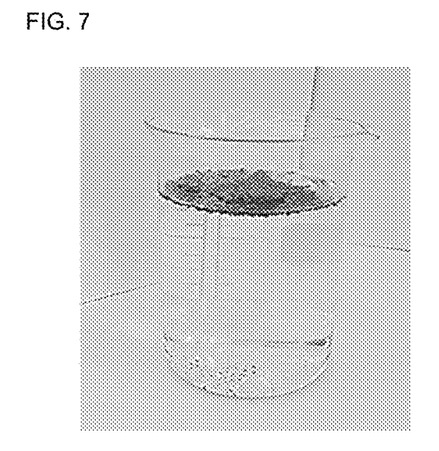
Figure 8:
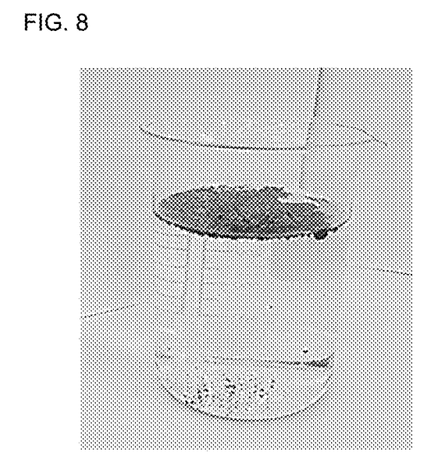
Figure 9:
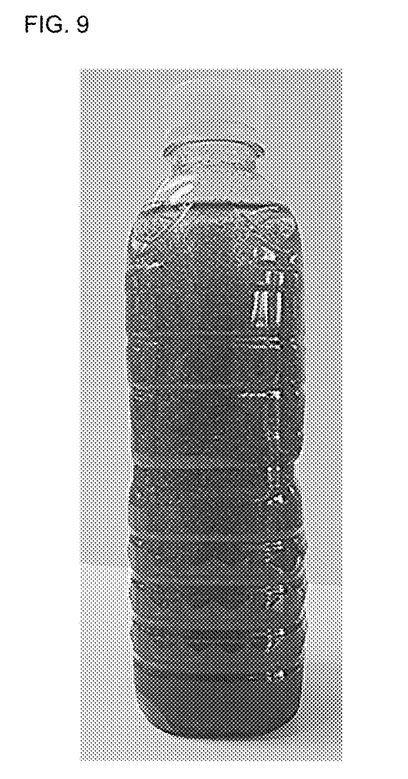
FIG. 9 is a photograph showing a processed product of tea Example 3 put in a bottle containing 500 mL of water after inverting the bottle once above and below.
Figure 10:
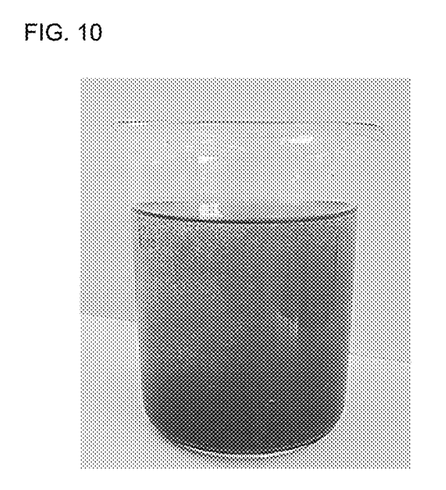
FIG. 10 is a photograph showing a processed product of tea of Example 3 put in a beaker containing 500 mL of water after stirring once.

$D_{10}$: diameter of a particle corresponding to 10% cumulative subdistribution
$D_{50}$: median particle diameter (i.e., particle diameter at the point where the distribution ratio of a particle corresponds to 50%)
$D_{90}$: diameter of a particle corresponding to 90% cumulative subdistribution
$D_{4.3}$: average diameter calculated from particle volume From Test Example 1, it was found that Examples 1-7 with a sphericity $S_{10}$ value of 0.68 or greater had a significantly short wetting time compared to the wetting time of Comparative Examples 1-7 with a sphericity $S_{10}$ value of smaller than 0.68. The rate of dispersion of the processed products of tea according to one aspect of the present disclosure in a solvent (for example, water) was remarkably superior to powdered green tea or conventional granules of powdered green tea. Actually, when the processed products of tea according to one aspect of the present disclosure were placed in a cup, a tumbler, a bottle, etc., they were easily dispersed in water and thus could be used conveniently (see FIGS. 9 and 10).

Comparative Examples 2-4, in which the processed products of tea were prepared by adding maltitol or maltodextrin according to an existing method in order to improve dispersibility, also showed a long wetting time, and thus could not achieve the desired effect. Specifically, Comparative Examples 2-4 were not wetted at all during the wetting time measurement (3 minutes), leaving a significant amount on the water surface. Also, when they were placed in a bottle and then shaken, the processed products of tea were left around the opening of the bottle, showing that they had very low wettability.

Even when wetted, powdered green tea or granules of powdered green tea that have sunk may agglomerate without being dispersed well. However, it was found that the processed products of tea according to one aspect of the present disclosure had very excellent dispersibility, and thus exhibited almost no agglomeration even when not stirred or shaken (see FIGS. 1-3). In particular, although Example 4 showed a relatively longer wetting time than Examples 2 and 3, from the photographs taken immediately after the wetting time measurement, it was visually confirmed that the processed products of tea were dispersed well in water during wetting, and that the processed products of tea, which included insoluble materials, did not stick to or agglomerate with each other after being dispersed in water, and thus had excellent redispersibility.

As described above, it was found that the processed products of tea according to one aspect of the present disclosure with a sphericity $S_{10}$ value of 0.68 or greater can be composed only of tea powders without an additive such as a binder and have rapid dispersion properties. These dispersion properties were remarkably superior to Comparative Examples 1-7. Therefore, it was found that in the particulate processed products of tea, the sphericity of particle, the particle size and particle size distribution affect dispersibility, and that smaller particle size of the processed products of tea does not mean higher dispersibility.

From Test Example 4, it was found that Examples 1-7 had very good flowability, unlike Comparative Examples 1-7, which had an angle of repose exceeding 35°. Thus, it was found that the processed products of tea according to one aspect of the present disclosure have very good fluidity and thus are easy to package and use.

Figure 11:
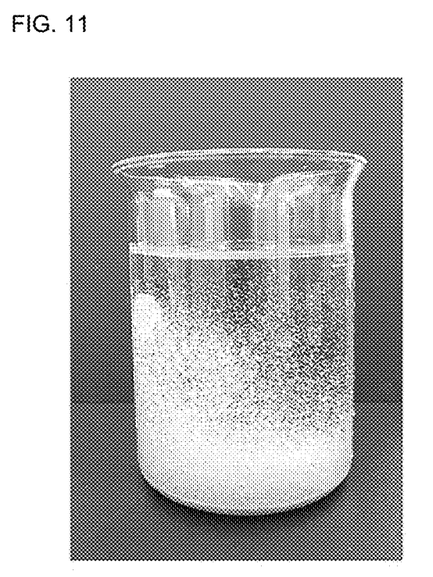
FIG. 11 is a photograph showing the dispersed state of 1.5 g of a sample of Example 1 put in a beaker containing 500 mL of water after leaving alone for 20 seconds, according to a Test Example of the present disclosure.
Figure 12:
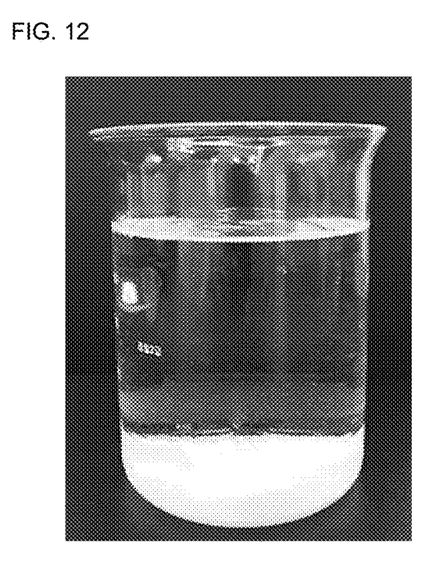
FIG. 12 is a photograph showing the dispersed state of 1.5 g of a sample of Comparative Example 8 put in a beaker containing 500 mL of water after leaving alone for 20 seconds, according to a Test Example of the present disclosure.
Figure 13:
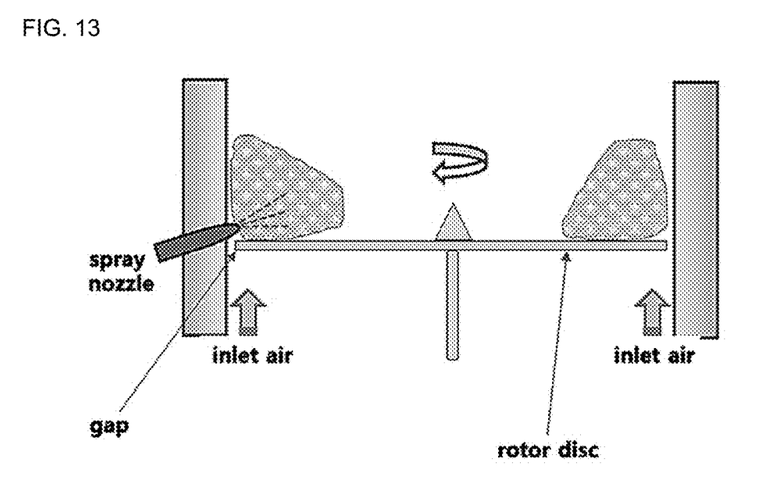
FIG. 13 is a schematic diagram of a rotor-type fluidized-bed granulator according to an exemplary embodiment of the present disclosure.

Further, when each of the samples of Example 1 and Comparative Example 8 was added to water under the same condition, the processed product of tea of Example 1 remained well dispersed in water even after 20 seconds, whereas the crystalline cellulose of Comparative Example 8 completely sank to the bottom after 20 seconds (see FIGS. 11 and 12). As described above, the crystalline cellulose was found to have low dispersibility and redispersibility even though it showed the highest sphericity from among Examples and Comparative Examples. Therefore, it was found that the sphericity and dispersion properties are not always in proportion to or in inverse proportion to each other, but the type of particles may act as a factor that influences the dispersion properties, and thus, even when the sphericity is high, the dispersion properties may vary depending on the type of particles.

While the present disclosure has been described with respect to the specific embodiments, it will be apparent to those of ordinary skill in the art that the above descriptions are only preferred embodiments and that the scope of the present disclosure is not limited thereto. Thus, the scope of the present disclosure should be defined by the appended claims and equivalents thereof.

The invention claimed is:

1. A particulate processed product of tea, comprising tea particles,
    wherein the tea particles exhibit a sphericity $S_{10}$ value of 0.68 or greater,
    wherein the sphericity $S_{10}$ value is a sphericity of a particle corresponding to 10% cumulative subdistribution in cumulative distribution measured for the sphericity of tea particles, and
    wherein the particulate processed product of tea comprises 20 mass % or less of fine powders based on the total mass of the tea particles and the fine powders have a particle diameter of 75 μm or smaller.

2. The particulate processed product of tea according to claim 1, wherein the sphericity $S_{10}$ value is 0.70 or greater.

3. The particulate processed product of tea according to claim 2, wherein the sphericity $S_{10}$ value is 0.72-0.84.

4. The particulate processed product of tea according to claim 1, wherein a difference in a sphericity $S_{90}$ value of a particle corresponding to 90% cumulative subdistribution and the sphericity $S_{10}$ value of a particle corresponding to 10% cumulative subdistribution ($S_{90}-S_{10}$) in cumulative distribution measured for the sphericity of tea particles is less than 0.20.

5. The particulate processed product of tea according to claim 4, wherein the $S_{90}-S_{10}$ is less than 0.15.

6. The particulate processed product of tea according to claim 1, wherein the processed product of tea has an average particle diameter of the total tea particles of 100-300 μm.

7. The particulate processed product of tea according to claim 1, wherein the particulate processed product of tea comprises 15 mass % or less of fine powders based on the total mass of the tea particles.

8. The particulate processed product of tea according to claim 1, wherein the tea particles have one or more of following particle size distribution values of:
    i) a particle size distribution $D_{10}$ value of 50 μm≤$D_{10}$≤200 μm;
    ii) a particle size distribution $D_{50}$ value of 100 μm≤$D_{50}$≤250 μm; and
    iii) a particle size distribution $D_{90}$ value of 200 μm≤$D_{90}$≤600 μm,
    wherein, in i) to iii), $D_{10}$, $D_{50}$ and $D_{90}$ respectively refer to a particle diameter corresponding to 10% cumulative subdistribution, a median particle diameter and a particle diameter corresponding to 90% cumulative subdistribution in cumulative distribution measured for the particle diameter of tea particles.

9. The particulate processed product of tea according to claim 8, wherein the particle size distribution $D_{10}$ value ranges 80 μm≤$D_{10}$≤170 μm, the particle size distribution $D_{50}$ value ranges 150 μm≤$D_{50}$≤250 μm, and the particle size distribution $D_{90}$ value ranges 280 μm≤$D_{90}$≤600 μm.

10. The particulate processed product of tea according to claim 1, wherein the processed product of tea has an angle of repose of 35° or smaller.

11. The particulate processed product of tea according to claim 1, wherein the processed product of tea has a wetting time of 100 seconds or shorter when contacted with water, wherein the wetting time is the time required for the whole processed product of tea to sink below water surface when 1.5 g of the processed product of tea is placed on the water surface, and the amount of the water is 500 mL.

12. The particulate processed product of tea according to claim 1, wherein the tea is tea leaf.

13. The particulate processed product of tea according to claim 1, wherein the tea is one or more selected from a group consisting of unfermented tea, semi-fermented tea, fermented tea and post-fermented tea.

14. The particulate processed product of tea according to claim 13, wherein the tea is green tea.

15. The particulate processed product of tea according to claim 1, wherein the processed product of tea is a fine granule or a powder.

16. A method for preparing a particulate processed product of tea according to claim 1, comprising preparing tea particles from tea powder.

17. The method for preparing a particulate processed product of tea according to claim 16, wherein the preparing tea particles comprises using a rotor-type fluidized-bed granulator comprising a rotor disc to prepare the tea particles.

18. The method for preparing a particulate processed product of tea according to claim 17, wherein the rotor-type fluidized-bed granulator comprises: a container; a rotor disc formed inside the container; a gap-forming part provided between the rotor disc and a wall of the container and supplying air; and a nozzle-forming part formed adjacent to the gap-forming part and spraying water into the container.

19. The method for preparing a particulate processed product of tea according to claim 16, wherein the preparing tea particles comprises: placing tea powder on a rotor disc and rotating the rotor disc; levitating the tea powder by supplying air; and spraying water to the levitated tea powder.

20. The method for preparing a particulate processed product of tea according to claim 16, wherein the tea powder constituting 99 mass % or more of the total mass of the tea powder has a particle diameter of 75 μm or smaller.

* * * * *